US010578232B2

(12) United States Patent
Kerlin

(10) Patent No.: US 10,578,232 B2
(45) Date of Patent: Mar. 3, 2020

(54) PIPE HANGER SYSTEM

(71) Applicant: LSP Products Group, Inc., Irving, TX (US)

(72) Inventor: Andrew N. Kerlin, Minden, NV (US)

(73) Assignee: LSP Products Group, Inc., Irving, TX (US)

( * ) Notice: Subject to any disclaimer, the term of this patent is extended or adjusted under 35 U.S.C. 154(b) by 0 days.

(21) Appl. No.: 16/119,341

(22) Filed: Aug. 31, 2018

(65) Prior Publication Data

US 2019/0072213 A1    Mar. 7, 2019

Related U.S. Application Data

(60) Provisional application No. 62/554,688, filed on Sep. 6, 2017.

(51) Int. Cl.
| | |
|---|---|
| *F16L 3/12* | (2006.01) |
| *F16L 3/137* | (2006.01) |
| *F16L 3/16* | (2006.01) |
| *F16L 3/133* | (2006.01) |

(52) U.S. Cl.
CPC .............. *F16L 3/137* (2013.01); *F16L 3/133* (2013.01); *F16L 3/16* (2013.01)

(58) Field of Classification Search
CPC ............ F16L 3/01; F16L 3/133; F16L 3/1083
See application file for complete search history.

(56) References Cited

U.S. PATENT DOCUMENTS

| | | | | |
|---|---|---|---|---|
| 1,966,899 | A * | 7/1934 | McCabe | F16L 3/133 248/62 |
| 2,918,724 | A | 12/1959 | Thurman | |
| 3,244,388 | A | 4/1966 | Coffman | |
| 3,851,979 | A | 12/1974 | Becker | |
| 5,221,064 | A * | 6/1993 | Hodges | F16L 3/133 248/333 |
| 5,746,401 | A * | 5/1998 | Condon | F16L 3/133 248/62 |
| 5,890,683 | A * | 4/1999 | DePietro | F16L 3/133 248/58 |
| 6,685,144 | B1 * | 2/2004 | Wochnick | F16L 3/085 248/60 |

(Continued)

FOREIGN PATENT DOCUMENTS

| | | |
|---|---|---|
| CN | 204420327 U | 6/2015 |
| WO | 02086368 A1 | 10/2002 |

OTHER PUBLICATIONS

Australian Application No. 2018226407, Examination Report dated Jan. 18, 2019.

(Continued)

*Primary Examiner* — Amy J. Sterling
(74) *Attorney, Agent, or Firm* — Thomas Horstemeyer, LLP

(57) ABSTRACT

Various embodiments of the present disclosure relate to a pipe hanger system. In one embodiment, among others, the pipe hanger system comprises a socket, a support rod, and a strap. A first end of the support rod 106 can be positioned in an inner cavity of the socket. The first end of the support rod 106 can comprise a ball. A second end of the support rod can be attached to a support structure. The strap can be used to secure a pipe to the pipe hanger system.

21 Claims, 17 Drawing Sheets

(56) References Cited

U.S. PATENT DOCUMENTS 8,356,777 B2 * 1/2013 Miles .................. F16L 3/133
                                              248/292.12
8,920,105 B2   12/2014 Moriguchi et al.

OTHER PUBLICATIONS

New Zealand Application No. 745975 First Examination Report dated Dec. 5, 2018.

* cited by examiner

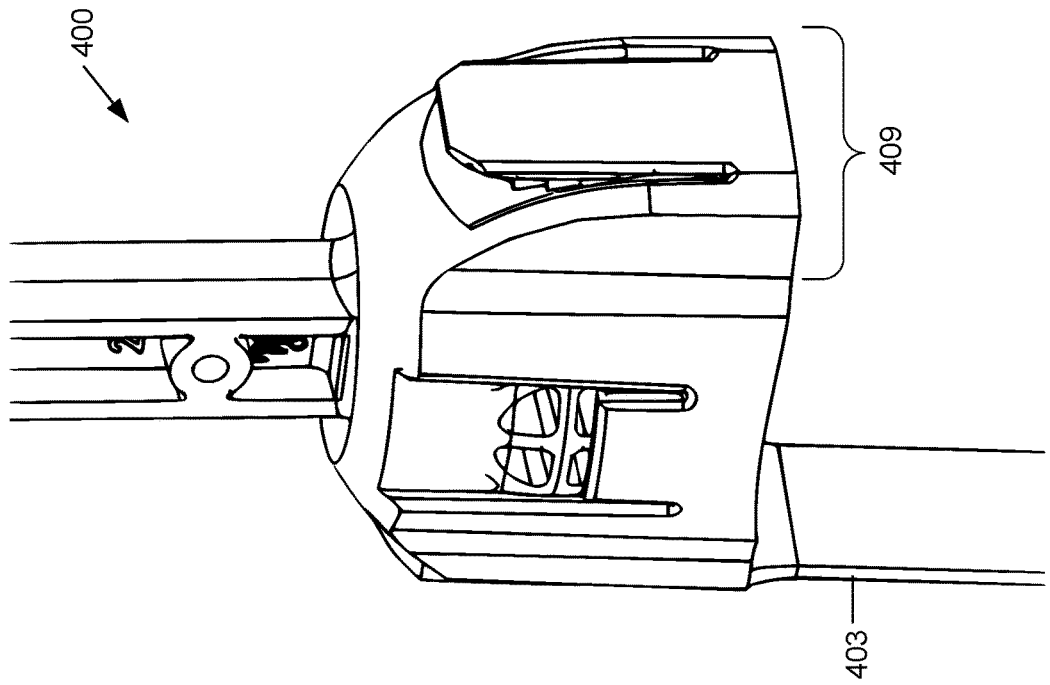
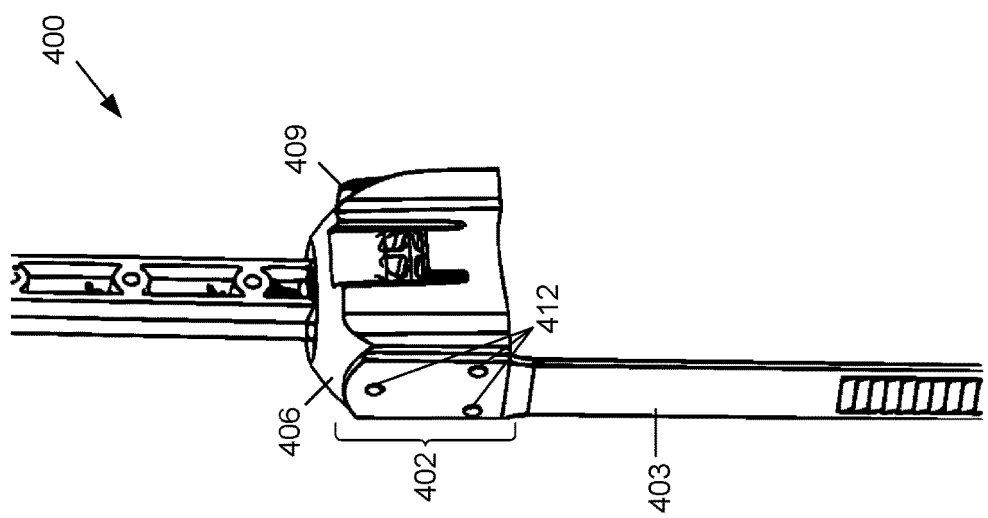

PIPE HANGER SYSTEM

CROSS REFERENCE TO RELATED APPLICATIONS

This application claims the benefit of, and priority to, co-pending U.S. Provisional Patent Application No. 62/554,688 entitled "PIPE HANGER SYSTEM" filed on Sep. 6, 2017, which is incorporated herein by reference in its entirety.

BACKGROUND

Pipe hangers are used to suspend a network of pipes throughout a structure. The pipe hangers transfer the load of the pipe and its contents to the supporting structure. Contractors installing pipe hangers can experience various problems during installation.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIGS. 4A and 4B illustrate perspective views of a strap-attached hanger system according to one embodiment described herein.

Figure 1:
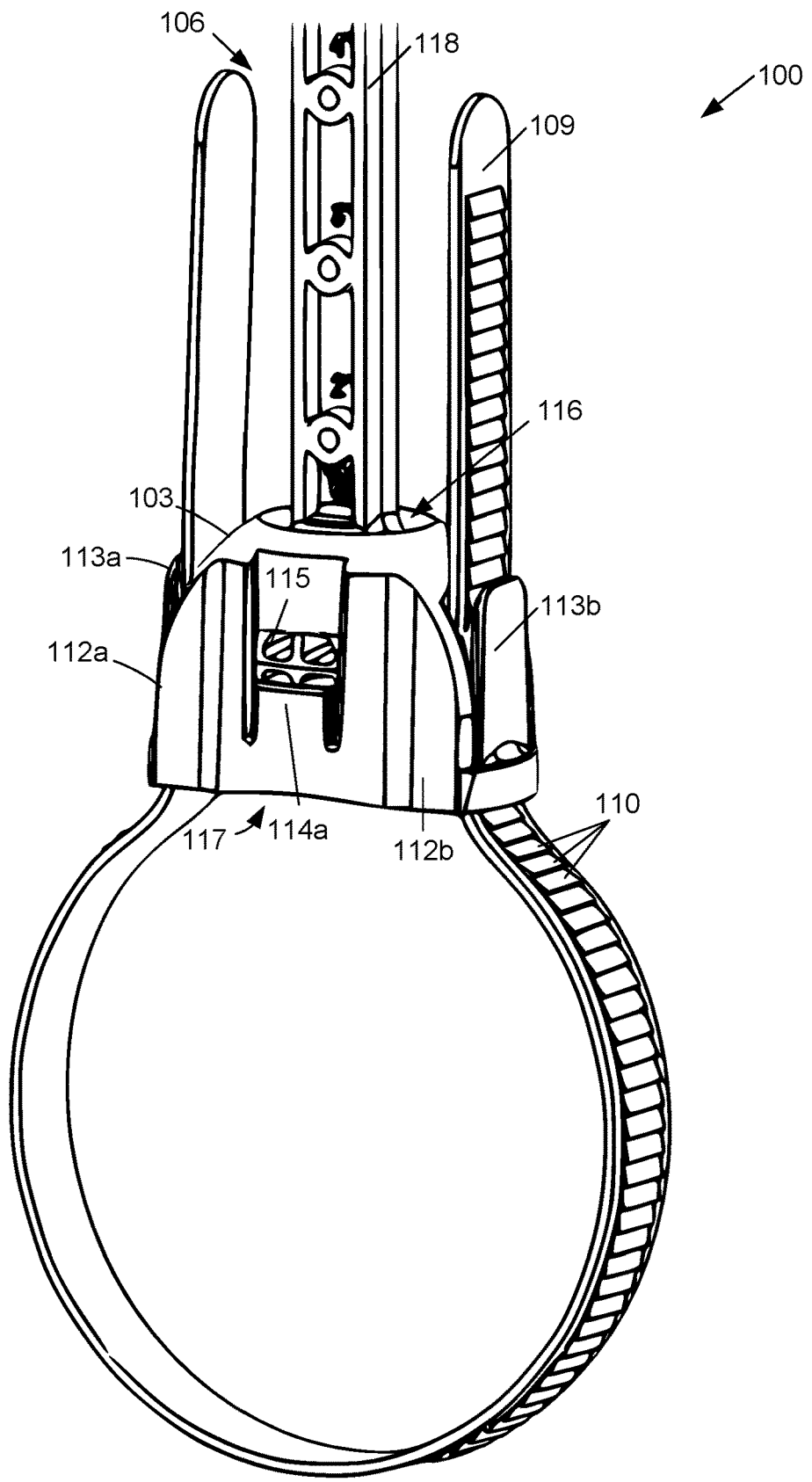
FIG. 1 is a perspective view of a pipe hanger system, according to one embodiment described herein.

The drawings illustrate only exemplary embodiments and are therefore not to be considered limiting of the scope of the embodiments described herein, as other equally effective embodiments are within the scope and spirit of this disclosure. The elements and features shown in the drawings are not necessarily drawn to scale, emphasis instead being placed upon clearly illustrating the principles of the exemplary embodiments. Additionally, certain dimensions or positionings may be exaggerated to help visually convey certain principles. In the drawings, similar reference numerals between figures designates like or corresponding, but not necessarily identical, elements.

DETAILED DESCRIPTION

Pipe hangers are generally used to support a network of pipes suspending from a structure. The pipe hangers are used to transfer the load of the pipe and its contents to the supporting structure. During installation, a contractor can experience various challenges such as pipe alignment, properly securing a pipe to a hanger, slope adjustments, and various other issues.

The various embodiments of the present disclosure relate to a pipe hanger system that comprises a ball and socket. Using a ball and socket configuration, the embodiments enable easier assembly for contractors during installation. As a non-limiting example, the embodiments can reduce the number of steps required for assembly. Assuming a fully assembled pipe hanger is being used, a pipe can be inserted through a loop formed by a strap that is attached to an embodiment. After inserting the pipe through the loop, the pipe can be secured by pulling on one end of the strap to tighten the loop.

Other advantages include greater flexibility for making adjustments to a pipe configuration before fully tightening the hanger. For example, after tightening the strap, the ball and socket connection enables the pipe to be swiveled in 360 degrees. This swiveling motion does not create additional strain on any of the components of the pipe hanger because of the ball and socket configuration. Further, the ball and socket connection enable the socket to pivot +/−15 degrees with respect to a horizontal plane of the socket. This structural feature enables the socket to pivot to accommodate slope adjustments for a pipe. Some building code regulations require a minimum pipe slope for adequate drainage. For example, some building code regulations may dictate a minimum slope of a quarter inch drop per horizontal foot for drainage pipes. The ball and socket configuration enable the attached pipes to accommodate some degree of pivoting to correspond with the slope of the pipe. In addition, the embodiments can enable better weight distribution of the pipe on the pipe hanger system. Thus, the various embodiments of the present disclosure enable swiveling and/or pivoting of a pipe hanger without creating additional strain on the pipe hanger. Turning to the drawings, a general description of embodiments of a pipe hanger system and its components is provided, followed by a discussion of the operation of the same.

With reference to FIG. 1, a perspective view of a pipe hanger system 100 is shown. The pipe hanger system 100 comprises a socket 103, a support rod 106, and a strap 109. A first end of the support rod 106 can be positioned in an inner cavity of the socket 103. The first end of the support rod 106 can comprise a ball 115. A second end of the support rod 106 can be attached to a support structure. The strap 109 can be used to secure a pipe to the pipe hanger system 100. In addition, the strap 109 can include a plurality of teeth 110. The teeth of the strap 109 can have a triangular shape, a rectangular shape, and other suitable shapes.

The socket 103 can comprise a first strap fastener 112a and a second strap fastener 112b (collectively "strap fastener 112"). A first end of the strap 109 can be inserted through a first frame of the first strap fastener 112a, and a second end of the strap 109 can be inserted through a second frame of the second strap fastener 112b. Each strap fastener 112 can comprise a release tab 113 that can facilitate releasing an end of the strap 109 from the frame of the strap fastener 112. The socket 103 can also comprise a locking tab 114 that forms a portion of a perimeter of a side aperture in the socket 103. The locking tab 114 can be used to secure the ball 115 in a position in the inner cavity of the socket 103. Particularly, the locking tab 114 can prevent the socket 103 from moving up along the support rod 106 toward the support structure and away from the pipe being secured. In some embodiments, the locking tab 114 can be a soft locking tab that moves away from and toward the center of the socket 103 to allow for portions of the support rod 106, such as the ball 115, to be positioned in an inner cavity of the socket 103. The socket 103 can also comprise a first aperture 116 associated with a first tier of the socket 103. The socket 103 can comprise a second aperture 117 (FIG. 2B) associated with a second tier of the socket 103.

The support rod 106 comprises the ball 115 and a rod 118. A first end of the rod 118 extends from the ball 115. Some non-limiting examples of the rod 118 may include an I-beam, H-beam, and other suitable elongated structures. The ball 115 can be positioned in an inner cavity of the socket 103. The ball 115 can be comprised of a plastic, polymer, or other suitable materials. The selected material of the ball 115 can enable it to slightly compress in response to applied pressure. A second end of the rod 118 can be attached to a support structure, such as a stud, a joist, and other suitable support locations. The ball 115 can facilitate the socket 103 to swivel about 360 degrees. In addition, the ball 115 can enable the socket 103 to pivot about +/-15 degrees with respect to a horizontal plane associated with the socket 103.

Next, a description of the operation of the illustrated pipe hanger system 100 is provided. As one non-limiting example, an opposing end of the rod 118 from the ball 115 can be inserted through the second aperture 117 of the socket 103 and then through the first aperture 116 of the socket 103. The rod 118 can be pulled through until the ball 115 contacts an inner surface of the socket 103. In one embodiment, among others, the inner surface of the socket 103 can comprise at least one of a spherical shape, a hemispherical shape, and other suitable shapes to correspond with the ball 115. The ball 115 is restrained in the socket 103 because the ball 115 has a diameter that is greater than a diameter of the first aperture 116 of the socket 103. The diameter of the ball 115 is also less than a diameter of the second aperture 117 of the socket 103, which enables the ball 115 to enter the inner cavity of the socket 103.

Next, the rod 118 can then be attached to a joist or a stud in a structure. A first end of the strap 109 can be inserted through a frame of the first strap fastener 112a. This insertion can cause a locking engagement between a first portion of teeth 110 on the strap 109 and with teeth in the frame of the first strap fastener 112a. As the strap 109 is pulled further through the frame of the first strap fastener 112a, a second portion of teeth 110 on the strap 109 can be involved in the locking engagement with the teeth in the frame of the first strap fastener 112a.

Further, a pipe can be positioned below the socket 103. The strap 109 can be wrapped substantially around the pipe, and the second end of the strap 109 can be inserted through a frame of the second strap fastener 112b. Thus, the strap 109 can support the weight of the pipe and its contents. The second end of the strap 109 can be further pulled through the frame of the second strap fastener 112b to tighten the strap 109 against the pipe. The strap 109 can be tightened until a portion of the pipe comes into contact with the ball 115 in the socket 103, which can be considered as a semi-locked configuration. At this stage, the socket 103 can swivel in 360 degrees around the ball 115. In addition, the socket 103 can pivot +/-15 degrees with respect to a horizontal plane associated with a top portion of the socket 103. The pivoting can enable the socket 103 to be angled in order to accommodate a slope of the pipe. After the pipe and the socket 103 are positioned correctly, an end of the strap 109 can be further pulled through the frame of one of the strap fastener 112. The strap 109 can be further tightened, which can cause the ball 115 to compress because of the additional applied pressure. The strap 109 can be tightened until a bottom curvature of the socket 103 comes into contact with a portion of the pipe, which can be considered as a fully-locked configuration.

Figure 2A:
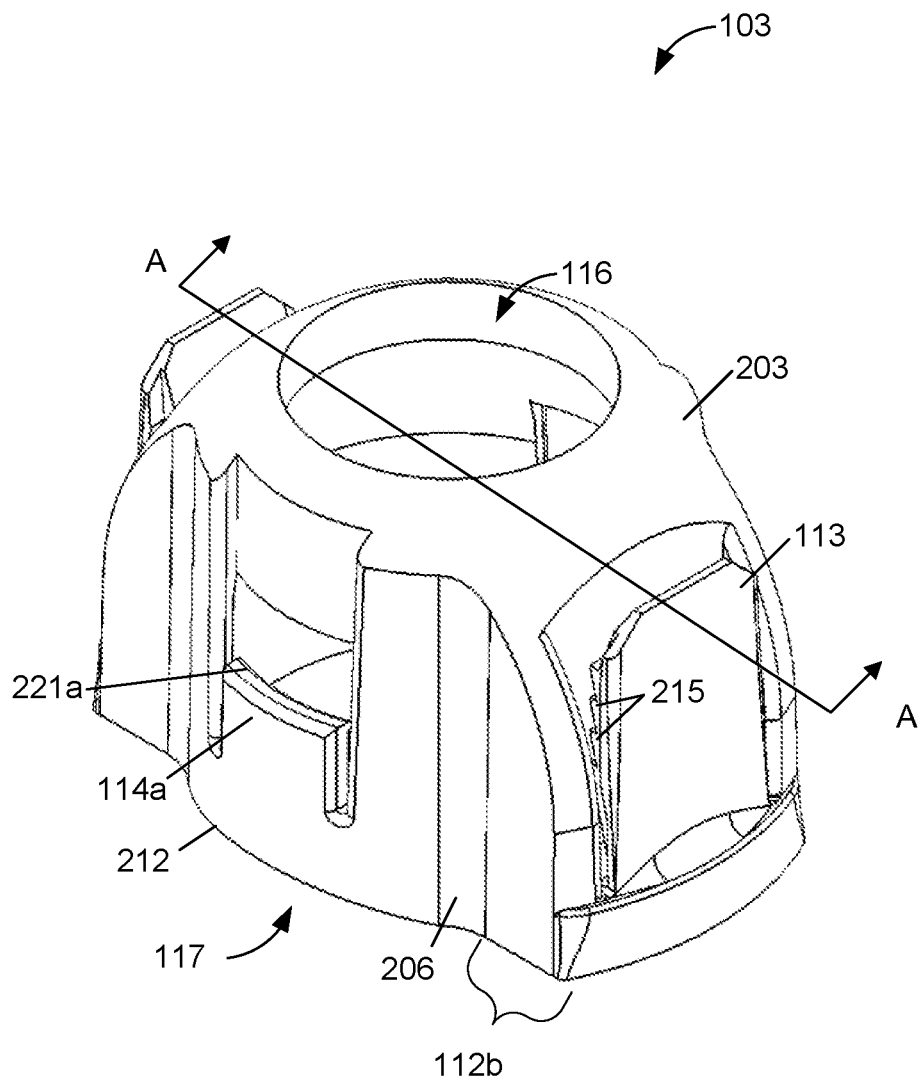
FIG. 2A illustrates a perspective view of the socket from FIG. 1 according to one embodiment described herein.

With reference to FIG. 2A, shown is a perspective view of the socket 103 in FIG. 1. FIG. 2A comprises an "A-A" cross-sectional reference for FIG. 2B. Further, FIG. 2A illustrates that the socket 103 comprises a first tier 203 and a second tier 206. The first tier 203 comprises the first aperture 116, which has a circular shape. The second tier 206 comprises the second aperture 117 through which the rod 118 can be inserted. The second tier 206 also comprises a circular shape and a curved bottom edge 212 that is used to engage the pipe in a fully-locked configuration. FIG. 2A also illustrates that the release tab 113 comprises teeth 215 for a locking engagement with a portion of the teeth 110 on the strap 109.

Figure 2B:
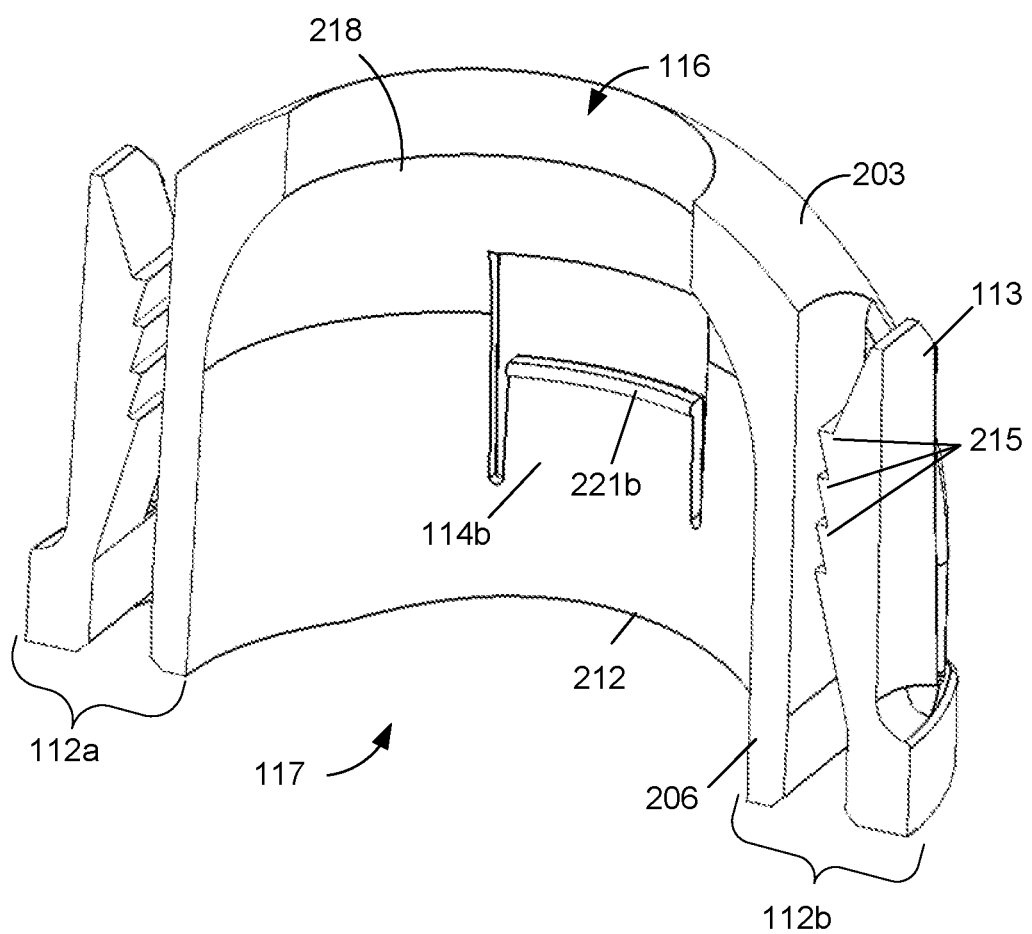
FIGS. 2B and 2C illustrate cross-sectional views of the socket from FIG. 2A according to one embodiment described herein.

Turning to FIG. 2B, shown is a cross-sectional view of the socket 103 shown in FIG. 2A. FIG. 2B illustrates an inner cavity of the socket 103. Particularly, the first tier 203 of the socket 103 comprises a curved inner surface 218. The curved inner surface 218 forms a portion of the inner cavity of the socket 103. The curved inner surface 218 can also enable the ball 115 to swivel and pivot about in the inner cavity. FIG. 2B also depicts that the locking tab 114b forms a portion of a perimeter of a side aperture of the socket 103. The locking tab 114b is illustrated as being between two slots. The locking tab 114b also comprises a locking rim 221b. Locking tab 114a also includes a locking rim 221a (FIG. 2A), and locking tab 114a is diametrically opposite locking tab 114b. The locking rims 221a, 221b (collectively referred to as "locking rims 221") can extend inward toward the center of the socket 103. The distance between the locking rim 221b to locking rim 221a associated with the locking tab 114a can be less than a diameter of the inner surface of the second tier of the socket 103. In addition, the distance between locking rim 221b to locking rim 221a associated with the locking tab 114a can also be less than the diameter of the ball 115. Thus, when the ball 115 is being moved toward the first tier 203 from the second tier 206 of the socket 103, the locking rims 221 can come into contact with the ball 115. For example, the locking rims 221 can cause an end of the locking tabs 114 to flex outward away from the inner cavity of the socket 103 as the ball 115 is further moved toward the first tier 203 of the socket 103. After the equator of the ball 115 (FIG. 2D) passes the locking rims 221, the locking rims 221 move inward toward the center of the socket 103. A portion of the ball 115 below its equator can come into contact with the locking rims 221, particularly creating a soft locking engagement. As a result, the locking rims 221 can facilitate securing the ball 115 within the inner cavity of the socket 103.

FIG. 2B also illustrates portions of the strap fastener 112. Particularly, FIG. 2B illustrates that the strap fastener 112b comprises teeth 215 on an inner surface. The release tab 113 can be moved in an outward direction away from the center the socket 103. This movement of the release tab 113 can disengage a locking engagement between the teeth 215 of the strap fastener 112b and the teeth 110 of the strap 109.

Figure 2C:
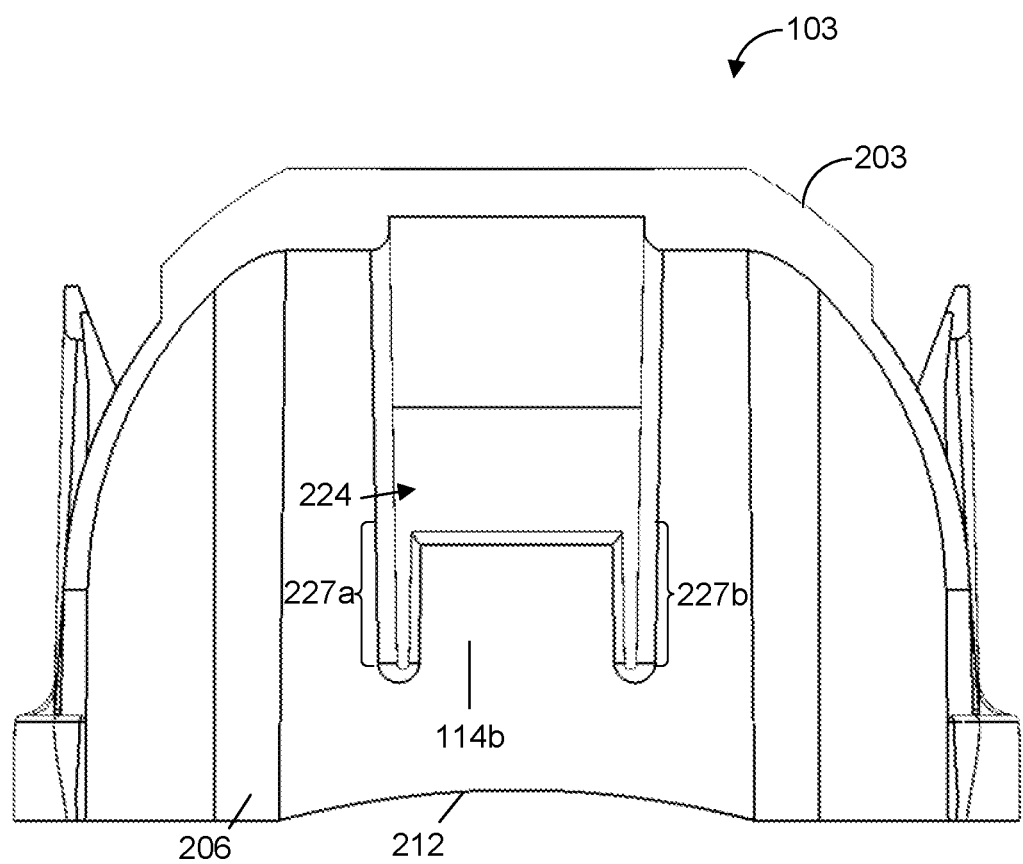

Turning to FIG. 2C, shown is an opposing view of the cross-sectional view of the socket 103 in FIG. 2B. FIG. 2C illustrates a side aperture 224 in the socket 103. A perimeter of the side aperture 224 can be formed by a portion of the first tier 203 of the socket 103, a portion of the locking tab 114b, and by channel slots 227a, 227b. FIG. 2C also illustrates the curved bottom edge 212 of the second tier 206. The curved bottom edge 212 can be configured to correspond to a particular curvature of a pipe. In some embodiments, when the ball 115 is locked in the inner cavity with the locking rims 221, a portion of the ball 115 can be exposed below the curved bottom edge 212. When the pipe hanger system 100 is tightened, the ball 115 can first come into contact with the pipe in the semi-lock configuration. By further tightening the strap 109, the curved bottom edge 212 can come into contact with a portion of the pipe, which can be considered as a fully-locked configuration. In this configuration, the ball 115 can be slightly compressed by the additional pressure, locking the ball 115 against the pipe and inner surface 218 of FIG. 2.B.

Figure 2D:
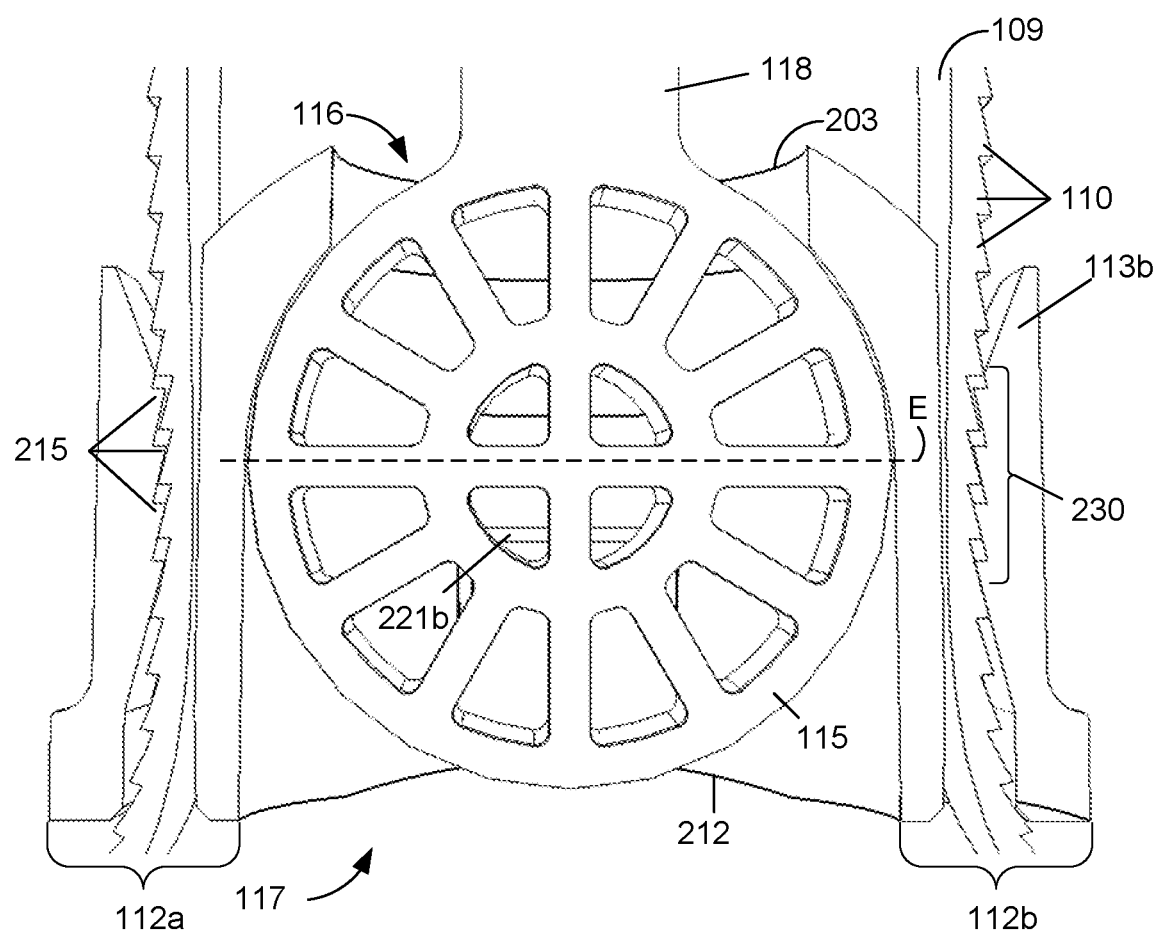
FIG. 2D illustrates a cross-sectional view of the pipe hanger system from FIG. 1 according to one embodiment described herein.

With reference to FIG. 2D, shown is a cross-sectional view of the pipe hanger system 100 with the ball 115 positioned in the inner cavity of the socket 103 and the strap 109 inserted in the strap fasteners 112. Particularly, FIG. 2D illustrates the ball 115 being positioned in the inner cavity of the socket 103 and portions of the strap 109 involved in a locking engagement 230 with the teeth 215 of the strap fastener 112. FIG. 2D also illustrates portions of the ball 115 being exposed below the curved bottom edge 212. In addition, FIG. 2D illustrates that the locking rim 221b is below the equator axis 'E' of the ball 115. As previously discussed, in this position, the ball 115 can be locked in the socket 103 because the locking rim 221b can be in contact with a portion of the ball 115 below its equator axis 'E.' Further, the angle of the teeth 215 of the strap fastener 112 can correspond with the angle of the teeth 110 of the strap 109 to enable further tightening by pulling an end of the strap 109 away from the socket 103.

Figure 3:
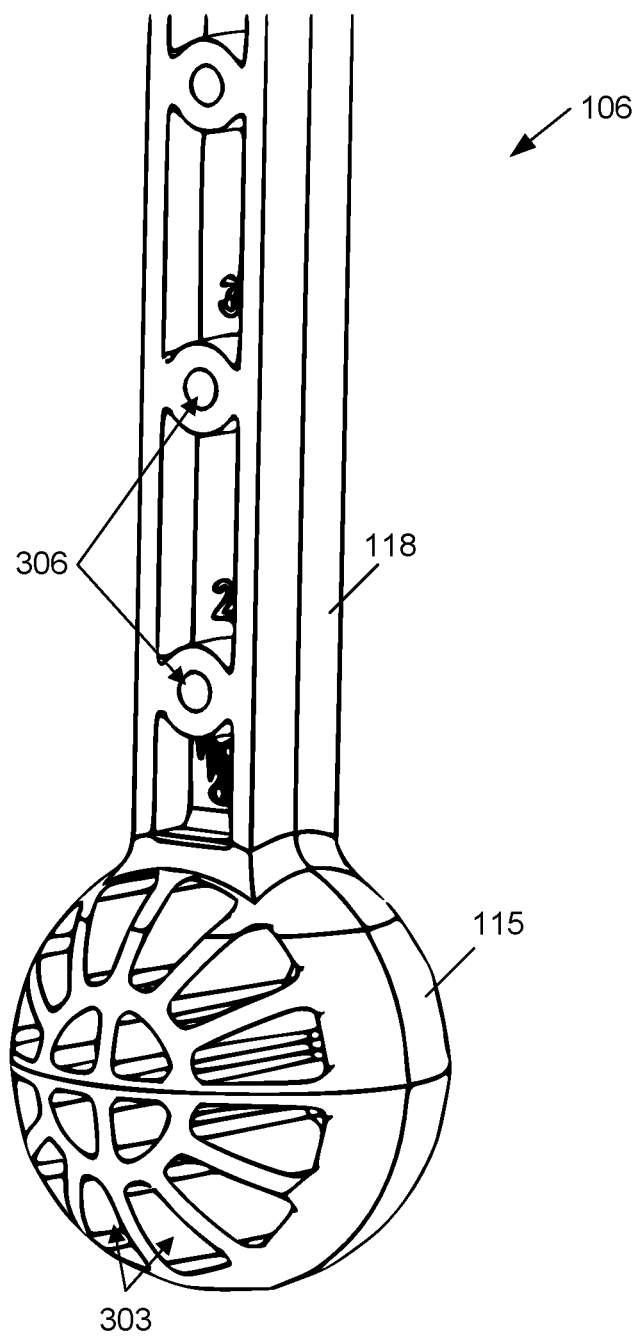
FIG. 3 illustrates a perspective view of a support rod from FIG. 1 according to one embodiment described herein.

Referring now to FIG. 3, shown is a perspective view of the support rod 106. As discussed previously, the support rod 106 comprises the ball 115 and the rod 118. Although FIG. 3 illustrates that the rod 118 has a ball 115 extending from one end, one skilled in the art can appreciate that the rod 118 can have structures of other shapes on its end. For example, in some embodiments, the rod 118 can have a hemispherical structure extending from one end. In other words, the lower half of the ball 115 can be removed. In this example, the top half of the ball 115 would still provide the capability of pivoting and swiveling within the socket 103. In addition, the ball 115 can comprise various apertures 303 to reduce its weight. In addition, FIG. 3 illustrates the rod 118 in an H-beam configuration. As one skilled in the art can appreciate, other beam configurations can be used for the rod 118. The rod 118 can also comprise various apertures 306 for securing the rod 118 to a stud or joist. For example, a nail can be inserted through one of the apertures 306 to secure it to a joist or other support structure.

Referring now to FIGS. 4A and 4B, shown are perspective views of a strap-attached hanger system 400. FIG. 4A illustrates a first end of a strap 403 connected to a socket 406. The first end comprises a snap-on head 402 that can be mated with a docking section on the socket 406. In the illustrated embodiment, the snap-on head 402 comprises three apertures. The docking section of the socket 406 comprises three raised protrusions 412 that mate with the apertures on the snap-on head 402. The socket 406 also comprises a strap fastener 409, from which a second end of the strap 403 can be inserted through the strap fastener 409. Alternatively, in some embodiments, the first end of the strap 403 can be integrally connected to the socket 406. In other words, the strap 403 and the socket 406 can be a single molded component. FIG. 4B illustrates an opposing view of the strap-attached hanger system 400 illustrated in FIG. 4A.

Figure 5A:
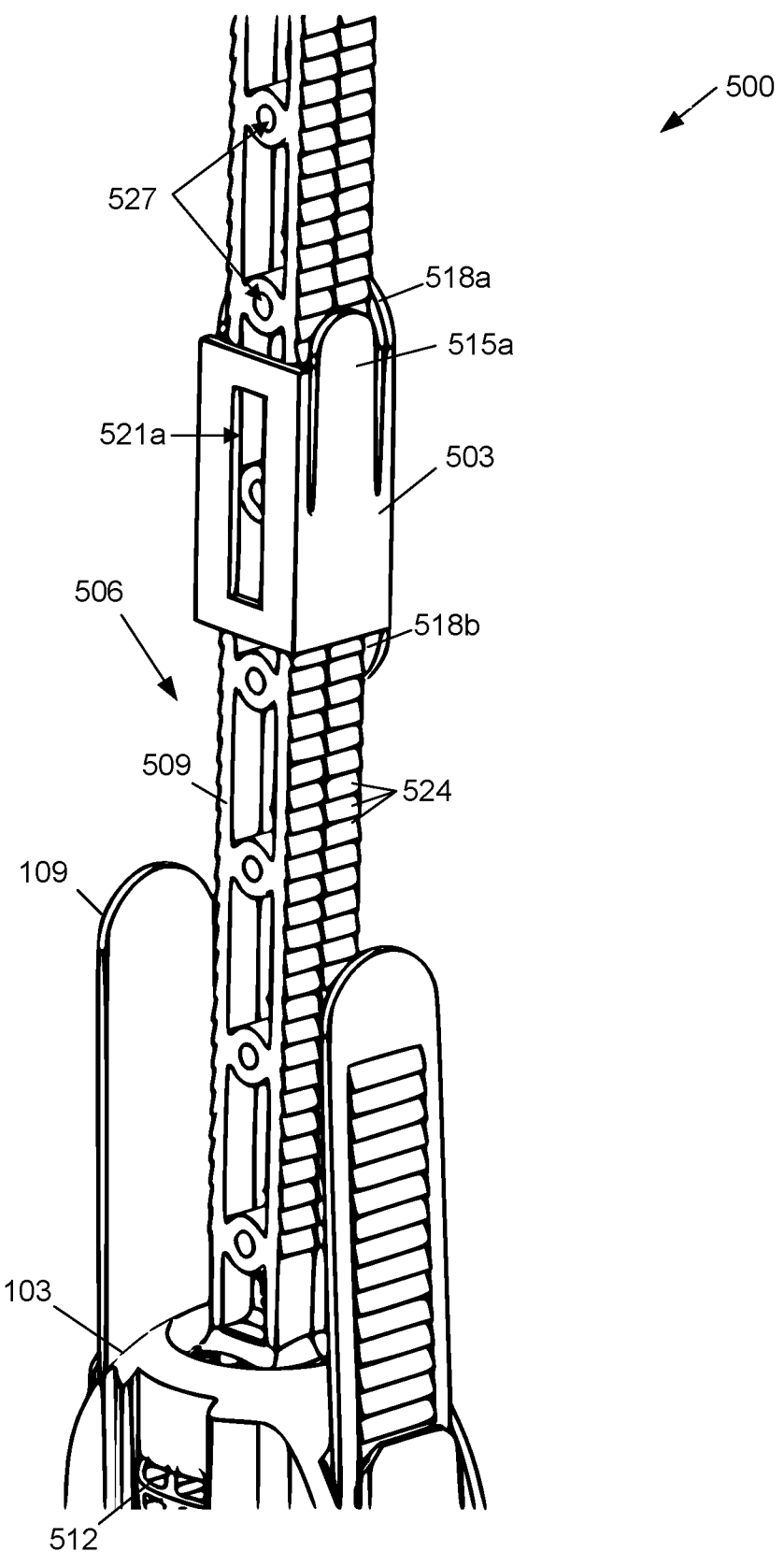
FIG. 5A illustrates a perspective view of an adjustable pipe hanger system according to one embodiment described herein.
Figure 5B:
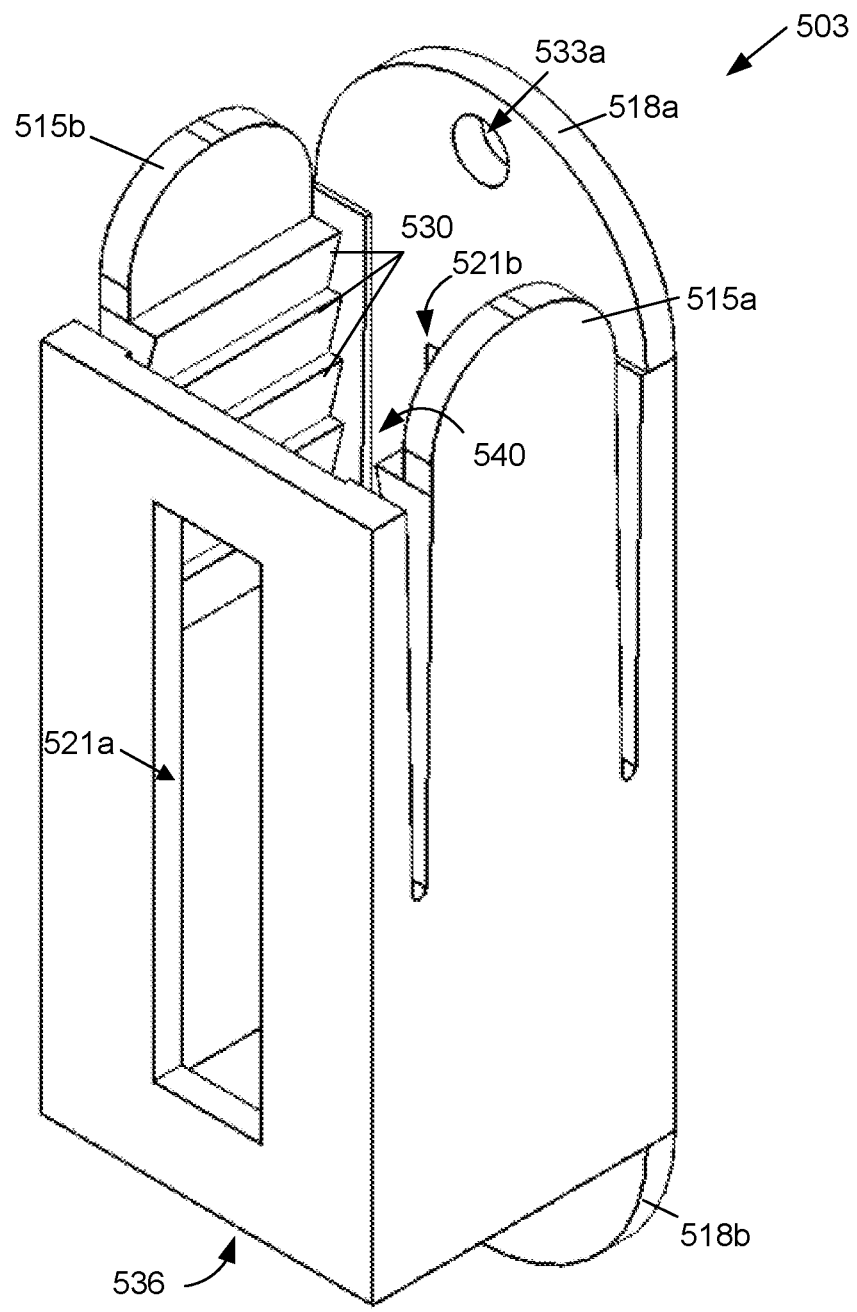
FIGS. 5B through 5D illustrate various views of a mounting bracket from FIG. 5A according to one embodiment described herein.

Turning to FIG. 5A, shown is a perspective view of an adjustable pipe hanger system 500. The adjustable pipe hanger system 500 comprises a mounting bracket 503 and an adjustable support rod 506. The mounting bracket 503 can be attached to a stud, a joist, and other suitable support structures. The mounting bracket 503 can form a locking engagement with the adjustable support rod 506. The mounting bracket 503 comprises a frame that has a first release tab 515a and a second release tab 515b (collectively referred to as "release tabs 515") on opposing sides. In other words, the release tabs 515 can be parallel to each other with respect to their locations on the frame. The second release tab 515b is illustrated in FIG. 5B. The mounting bracket 503 also comprises a first mounting tab 518a and a second mounting tab 518b (collective referred to as "mounting tabs 518"), which are located in a plane that is substantially perpendicular to the release tabs 515. The mounting tabs 518 can be used to attach the mounting bracket 503 to a joist or a stud of a support structure. The mounting bracket 503 comprises a first mounting aperture 521a that is located in a plane that is substantially parallel to the mounting tabs 518 and substantially perpendicular to the planes of the release tabs 515. In addition, the mounting bracket 503 also comprises a second mounting aperture 521b (FIGS. 5B and 5C) that is located between the mounting tabs 518.

The adjustable support rod 506 comprises an adjustable rod 509 and a ball 512. In the illustrated embodiment, the adjustable rod 509 comprises teeth 524 on opposing sides along its length. The teeth 524 of the adjustable rod 509 form a locking engagement with the release tabs 515 of the mounting bracket 503. The release tabs 515 can be used to release the locking engagement by moving an end of the release tab 515 away from the adjustable rod 509. The adjustable support rod 506 also comprises various apertures 527 along the length of the adjustable rod 509. The apertures 527 can be used to insert fasteners, such as nails, to secure the adjustable rod 509 to the support structure. The adjustable pipe hanger system 500 also comprises aspects from the pipe hanger system 100 (FIG. 1), such as the socket 103 and the strap 109.

Turning to FIG. 5B, shown is a perspective view of the mounting bracket 503. In this embodiment, FIG. 5B illustrates the first release tab 515a and the second release tab 515b as a part of the frame of the mount bracket 503. The release tabs 515 also comprise teeth 530 for forming a locking engagement with the teeth 524 of the adjustable rod 509. In addition, FIG. 5B illustrates that the first mounting tab 518a comprises an aperture 533a through which fasteners, such as nails, can be inserted. FIG. 5B illustrates a lower aperture 536 and a higher aperture 540 through which the adjustable rod 509 can be inserted through.

Figure 5C:
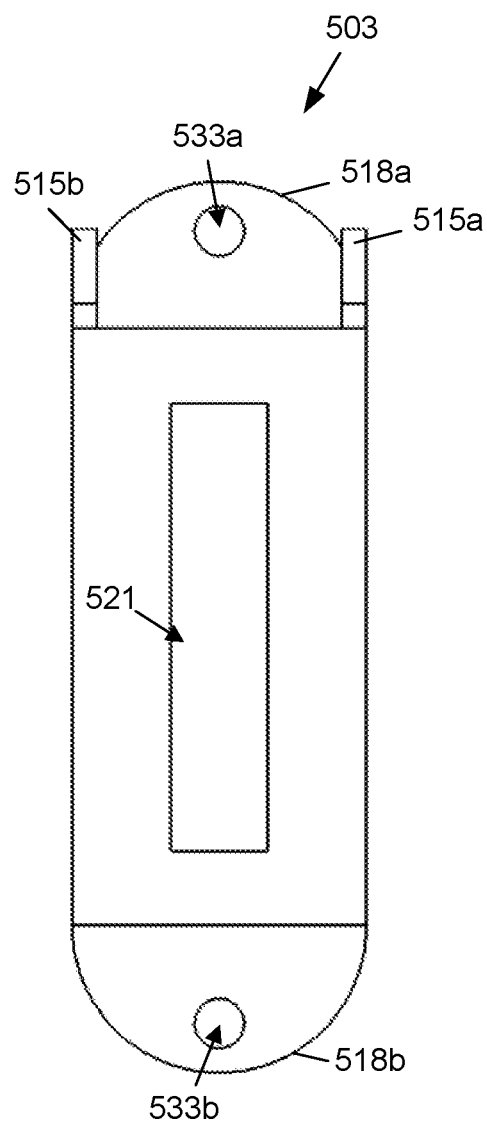
Figure 5D:
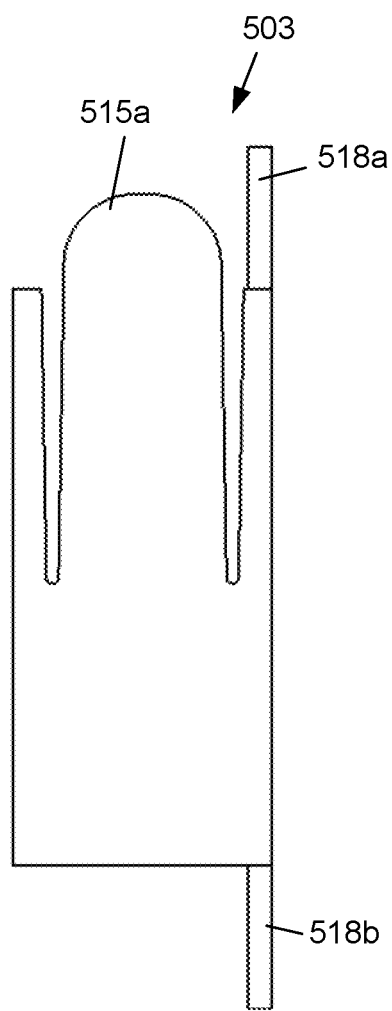

Turning to FIG. 5C, shown is a front view of the mounting bracket 503 from FIG. 5A. FIG. 5C illustrates that the first mounting tab 518a and the second mounting tab 518b comprise apertures 533a, 533b. In addition, FIG. 5C illustrates that the first mounting aperture 521a and the second mounting aperture 521b (collectively referred to as the mounting apertures 521) correspond to form a pass-through window for the mounting bracket 503. This pass-through window can be used to access the adjustable rod 509 to insert fasteners through the adjustable rod 509 and to a joist or other suitable support structure. Also, FIG. 5D illustrates a side view of the mounting bracket 503 of FIG. 5A. In this embodiment, FIG. 5D illustrates that the release tabs 515 have channel slots bordering them. The channel slots enable the release tabs 515 to move away from the adjustable rod 509, which enables the teeth 530 of the mounting bracket 503 to disengage from a locking engagement with the teeth 524 of the adjustable rod 509.

Next, referring between FIG. 5A through FIG. 5D, a description of an exemplary installation process of the illustrated adjustable pipe hanger system 500 is provided. To begin, the mounting bracket 503 can be positioned along a joist or a stud of a support structure. The positioning of the mounting bracket 503 can involve measuring the proper height for the adjustable pipe hanger system 500. As one non-limiting example, the mounting bracket 503 can be secured to the joist by inserting nails through the apertures 533a, 533b of the mounting tabs 518. Then, an end of the adjustable rod 509 can be inserted into and through the lower aperture 536. Then, the end of the adjustable rod 509 can be inserted through the higher aperture 540. As the adjustable rod 509 is moved through the higher aperture 540, the teeth 530 of the mounting bracket 503 can form a locking engagement with the teeth 524 of the adjustable rod 509. The adjustable rod 509 can be moved further through the higher aperture 540 and the lower aperture 536 such that the ball 512, socket 103 and strap 109 is moved closer to the mounting bracket 503. The locking engagement between the teeth 524 of the adjustable rod 509 and the teeth 530 of the mounting bracket 503 prevent the adjustable support rod 506 from moving in a direction from the higher aperture 540 to the lower aperture 536. However, the release tabs 515 can be used to disengage locking engagement by moving an end of the release tabs 515 away from the adjustable rod 509. This movement moves the teeth 530 of the mounting bracket 503 away from the teeth 524 of the adjustable rod 509, such that the teeth 530 of the mounting bracket 503 are no longer in contact with the teeth 524 of the adjustable rod 509. This clearance enables the adjustable rod 509 to move in a direction from the higher aperture 540 to the lower aperture 536. After the adjustable rod 509 has been positioned at a desired height, additional fasteners can be inserted through the mounting aperture 521 and/or the apertures 527 of the adjustable rod 509.

Figure 6A:
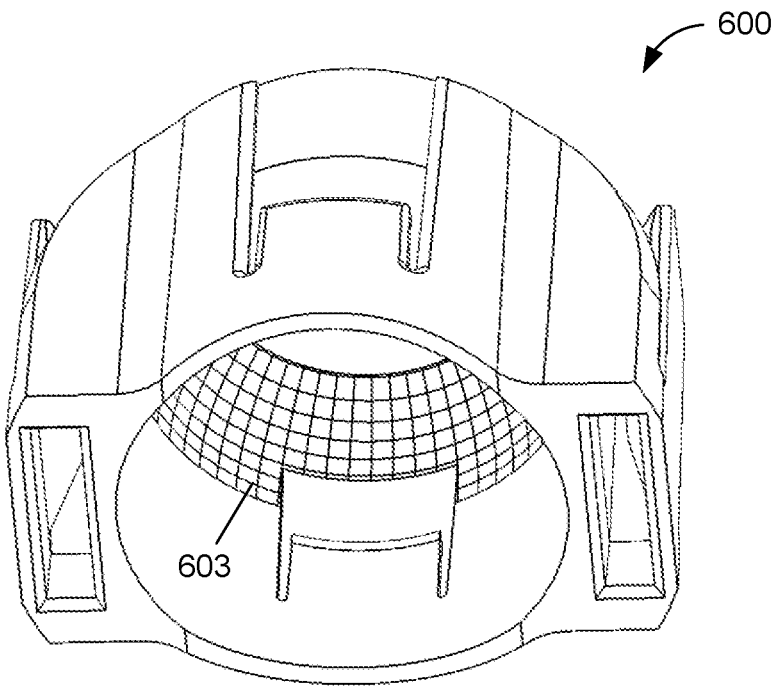
FIG. 6A illustrates an underside view of a coarse interior socket according to one embodiment described herein.
Figure 6B:
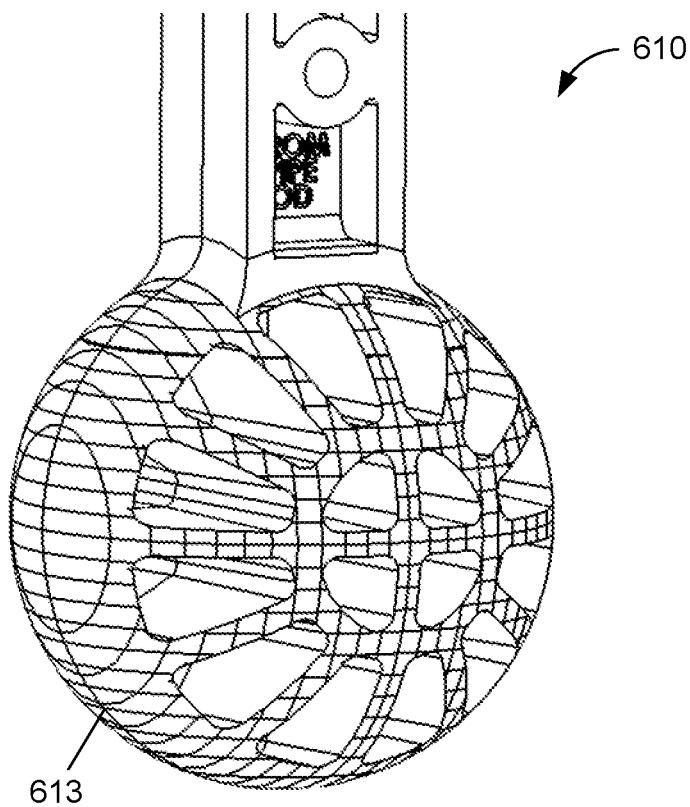
FIG. 6B illustrates a perspective view of a coarse support rod configured to be positioned inside of the coarse interior socket from FIG. 6A according to one embodiment described herein.

With reference to FIG. 6A, shown is an underside view of a coarse interior socket 600. The coarse interior socket 600 comprises an uneven inner surface 603 for a first tier of the coarse interior socket 600. The uneven inner surface 603 can have or be a rough texture, similar to sandpaper or other suitable rough textures. Turning to FIG. 6B, shown is a perspective view of a coarse support rod 610. The coarse support rod 610 comprises a ball 613 with an uneven outer surface. Referring between FIG. 6A and FIG. 6B, the uneven outer surface of the ball 613 can come into contact the uneven inner surface 603 of the coarse interior socket 600. Because of the uneven surfaces, the contact can create additional friction requiring additional force to move the ball 613 against the uneven inner surface 603 in the inner cavity of socket 600. As a result, the ball 613 and coarse interior socket 600 can have a more stable connection.

Figure 7A:
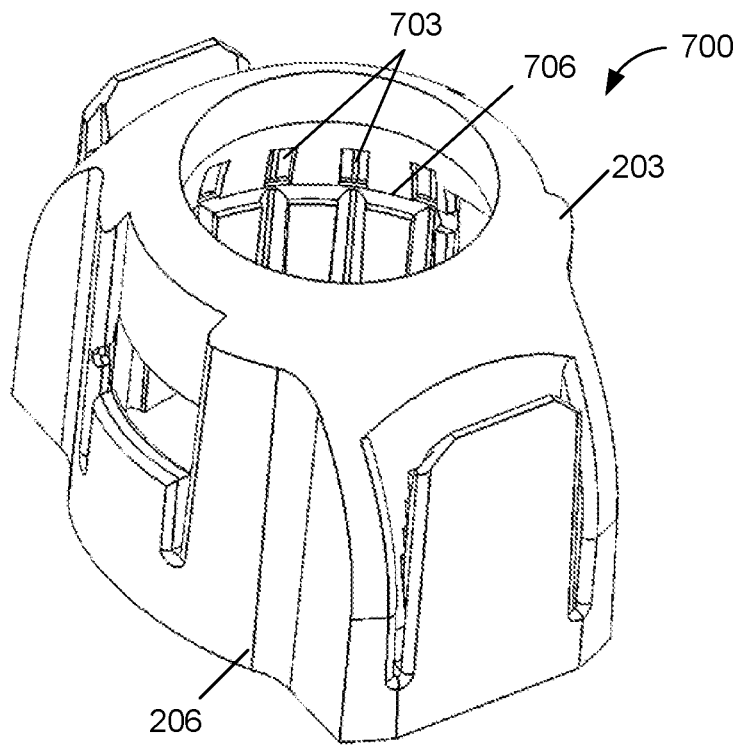
FIGS. 7A and 7B illustrate views of a slot interior socket according to one embodiment described herein.
Figure 7B:
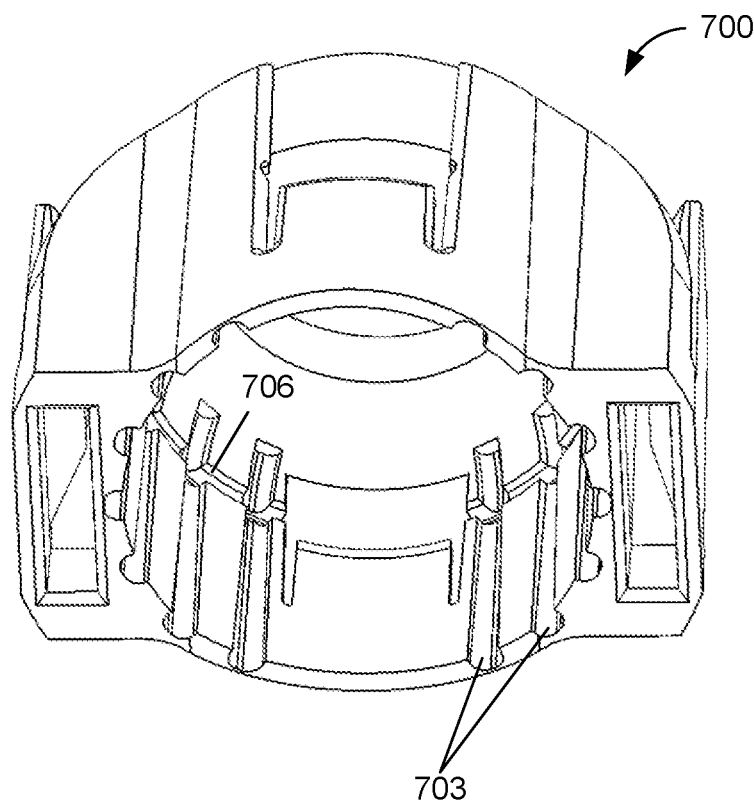

With reference to FIGS. 7A and 7B, shown are views of a slot interior socket 700. Particularly, FIG. 7A illustrates a top perspective view of the slot interior socket 700. FIG. 7A illustrates various individual vertical slots 703 oriented such that they are located in the first tier 203 and the second tier 206 of the slot interior socket 700. In this embodiment, the vertical slots 703 are parallel to each other. In addition, the slot interior socket 700 comprises a horizontal groove 706 that intersects with all of the vertical slots 703. FIG. 7B illustrates an underside view of the slot interior socket 700.

Figure 7C:
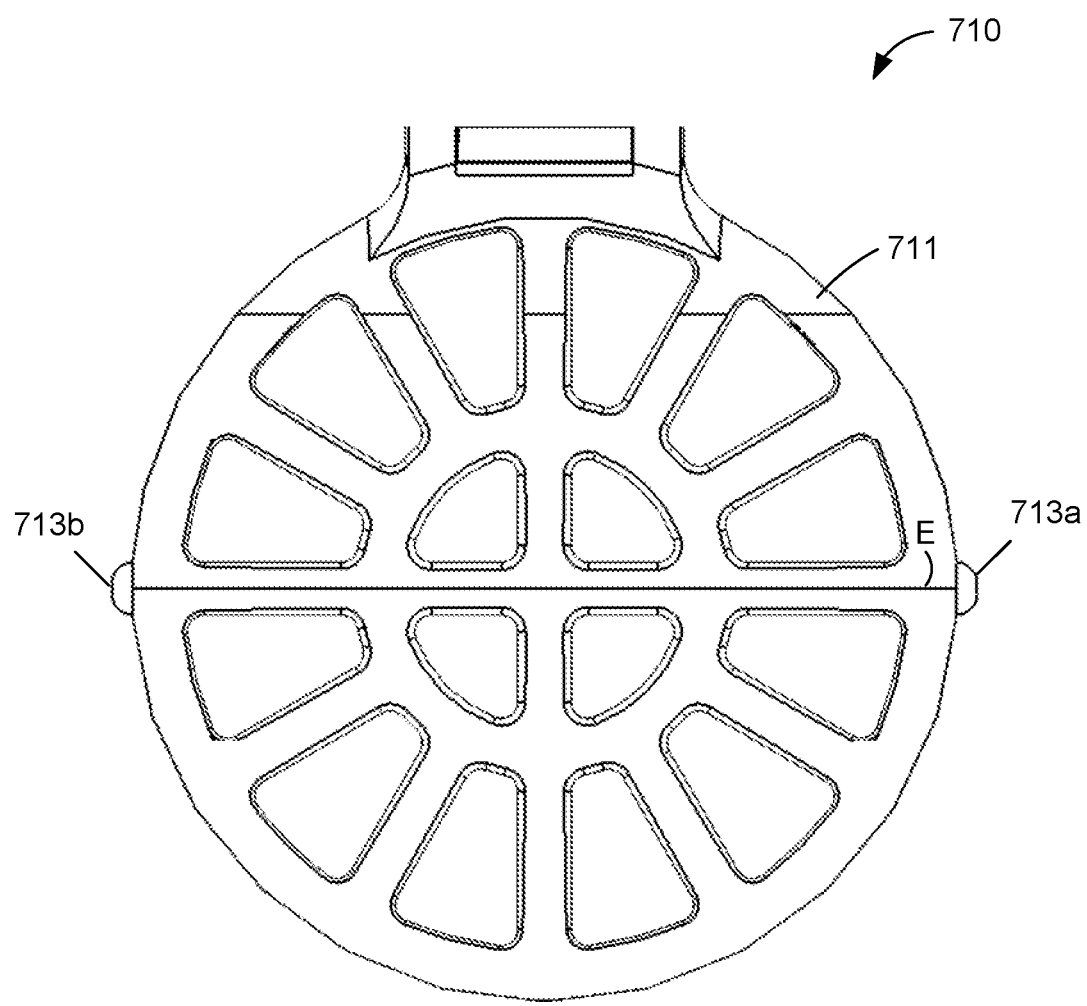
FIG. 7C illustrates a front view of a support rod with raised protrusions on a ball according to one embodiment described herein.

Next, with reference to FIG. 7C, shown is a front view of an alternative embodiment of a support rod 710 that can be used with the slot interior socket 700 (FIGS. 7A and 7B). FIG. 7C illustrates that the support rod 710 includes a ball 711 with raised protrusions 713a, 713b (collectively "raised protrusions 713"). The raised protrusions 713 can extend from an outer surface of the ball 711 and have a hemispherical shape. As one skilled in the art can appreciate, the number, the location, and the shape of the raised protrusions 713 can vary. In FIG. 7C, the raised protrusions 713 are diametrically opposite of each other and positioned substantially near an equator axis 'E' of the ball 711. The raised protrusions 713 can be oriented to correspond with the vertical slots 703 and horizontal groove 706 for the slot interior socket 700. As shown in FIGS. 7B and 7C, the shape of the raised protrusions 713 corresponds with the shape of the vertical slots 703 and horizontal groove 706. The raised protrusions 713 from the ball 711 can be adjusted to different slots 703 in the slot interior socket 700. However, when the raised protrusions 713 are positioned in the vertical slots 703, it is more difficult to move the ball 711 from its present location. Therefore, the ball 711 can be stabilized once the raised protrusions 713 are located in the vertical slots 703; making it more difficult to move the ball 711.

Figure 8:
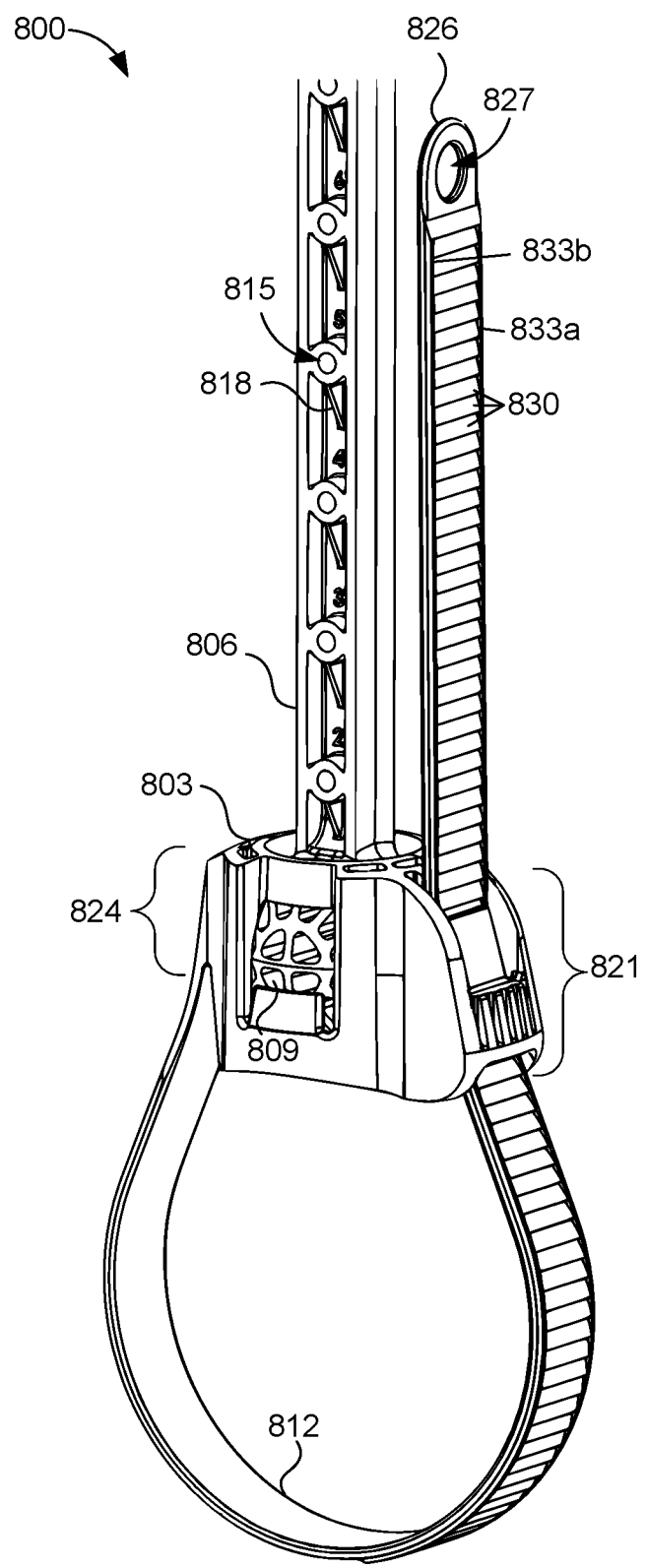
FIG. 8 illustrates a perspective view of an integrated strap hanger system according to one embodiment described herein.

Moving on to FIG. 8, shown is a perspective view of an integrated strap hanger system 800. The integrated strap hanger system 800 comprises a socket 803 and a support rod 806. A first end of the support rod 806 can be positioned in an inner cavity of the socket 803. The first end of the support rod 806 can comprise a ball 809. A second end of the support rod 806 can be attached to a support structure. The support rod 806 may comprise various mounting apertures 815 that may be uniformly spaced along the length of the support rod 806, similar to the apertures 306 in FIG. 3. The mounting apertures 815 can be used for inserting a fastener and attaching the support rod 806 at different points along its length to a support structure. The mounting apertures 815 can be formed from a cylindrical structure that extends through the support rod 806. Other structural shapes can be used to form the mounting apertures 815 as one skilled in the art can appreciate. FIG. 8 illustrates that adjacent to the cylindrical structure is an inclined rib 818, which supports the cylindrical structure. The inclined ribs 818 strengthen the mounting apertures 815.

The socket 803 may comprise a strap 812 that is used to secure a pipe to the integrated strap hanger system 800. The strap 812 may extend from a first side 824 of the socket 803. In some embodiments, the strap 812 and the socket 803 are a single structure. In other embodiments, the strap 812 may be attached to the socket 803. The socket 803 also comprises strap fastener 821 extending from a second side.

The strap 812 may comprise a strap aperture 827 at an end 826 and a plurality of teeth 830. The strap aperture 827 can be used for inserting a tool or a finger of an operator to help tighten the strap 812. The teeth 830 are depicted as being attached to a first side wall 833a and a second side wall 833b (collectively "side walls 833"). Each tooth of the strap 812 can be connected to an adjacent tooth via a shared connection to the side walls 833. Accordingly, the side walls 833 can be used to strengthen the rigidity of the teeth 833.

Next, a description of the operation of the illustrated integrated strap hanger system 800 is provided. Similar to the pipe hanger system 100, the integrated strap hanger system 800 can be assembled by inserting an end of the support rod 806 through a bottom aperture and then a top aperture of the socket 803. Then, the ball 809 may be positioned inside of the inner cavity of the socket 803. A pipe can be positioned at a base of the socket 803 and the strap 812 can be substantially wrapped around the pipe. The end 826 of the strap 812 can be inserted into and through the strap fastener 821. The teeth 833 of the strap 812 can engage with teeth of the strap fastener 821 to form a locking engagement.

Figure 9A:
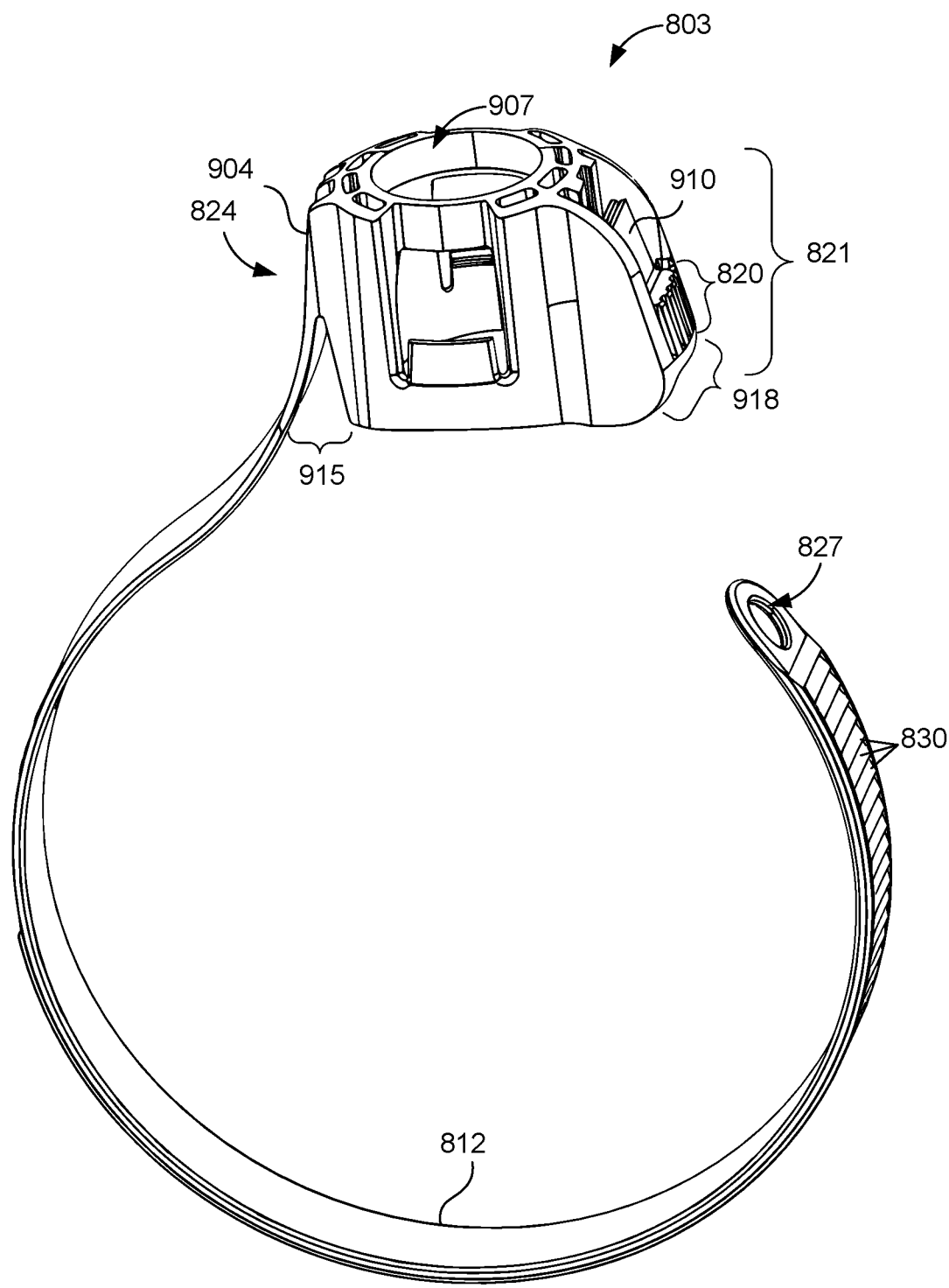
FIGS. 9A and 9B illustrate various views of a socket with an integrated strap according to one embodiment described herein.

Turning to FIG. 9A, shown is a perspective view of the socket 803 with an integrated strap 812. FIG. 9A illustrates that the strap 812 extends from the socket 803 at a connection point 904 that is substantially near the top of the first side 824 of the socket 803. In some embodiments, the connection point 904 is substantially near a socket aperture 907. The socket aperture 907 can be an aperture in which an end of the support rod 806 (FIG. 8) extends through. The socket aperture 907 also has a diameter that is smaller than the ball 809 (FIG. 8). Thus, the socket 803 prevents the ball 809 from passing through the socket aperture 907. Additionally, with the connection point 904 being near the top of the socket 803, a clearance area 915 is formed between the strap 812 and a base of the socket 803. The clearance area 915 and the connection point 904 of the strap 812 can reduce the amount of stress applied at a respective connection between the strap 812 and the socket 803 because the connection point 904 does not have to pivot or flex as much when the strap 812 is substantially wrapped around a pipe. Whereas, a connection point lower on the socket 803 may have additional stress, particularly when the strap 812 is substantially wrapped around a pipe with a diameter that is larger than the socket 803.

The strap fastener 821 also comprises a release tab 910. The release tab 910 can be used to release the strap 812 when it is in a locking engagement with the strap fastener 821. In order to release the strap 812, the release tab 910 can be moved away from a center of the socket 803. The strap fastener 821 also comprises reinforced ribs 820 which serve to provide structural support for the strap fastener 821. Particularly, the reinforced ribs 820 extend from the bottom of release tab 910 and serve as a base of structural support for the release tab 910. Accordingly, the reinforced ribs 820 allow for the release tab 910 to pivot while maintaining a base support structure that is minimally affected by the pivoting action.

In addition, the strap fastener 821 comprises a recessed area 918, similar in function as clearance area 915, for the strap 812. The recessed area 918 may provide space for the strap 812 to wrap around a pipe being secured to the integrated strap hanger system 800 (FIG. 8). Whereas, without the recessed area, the strap 812 would be restricted in flexing outward as the strap 812 is tightened while securing a pipe.

Figure 9B:
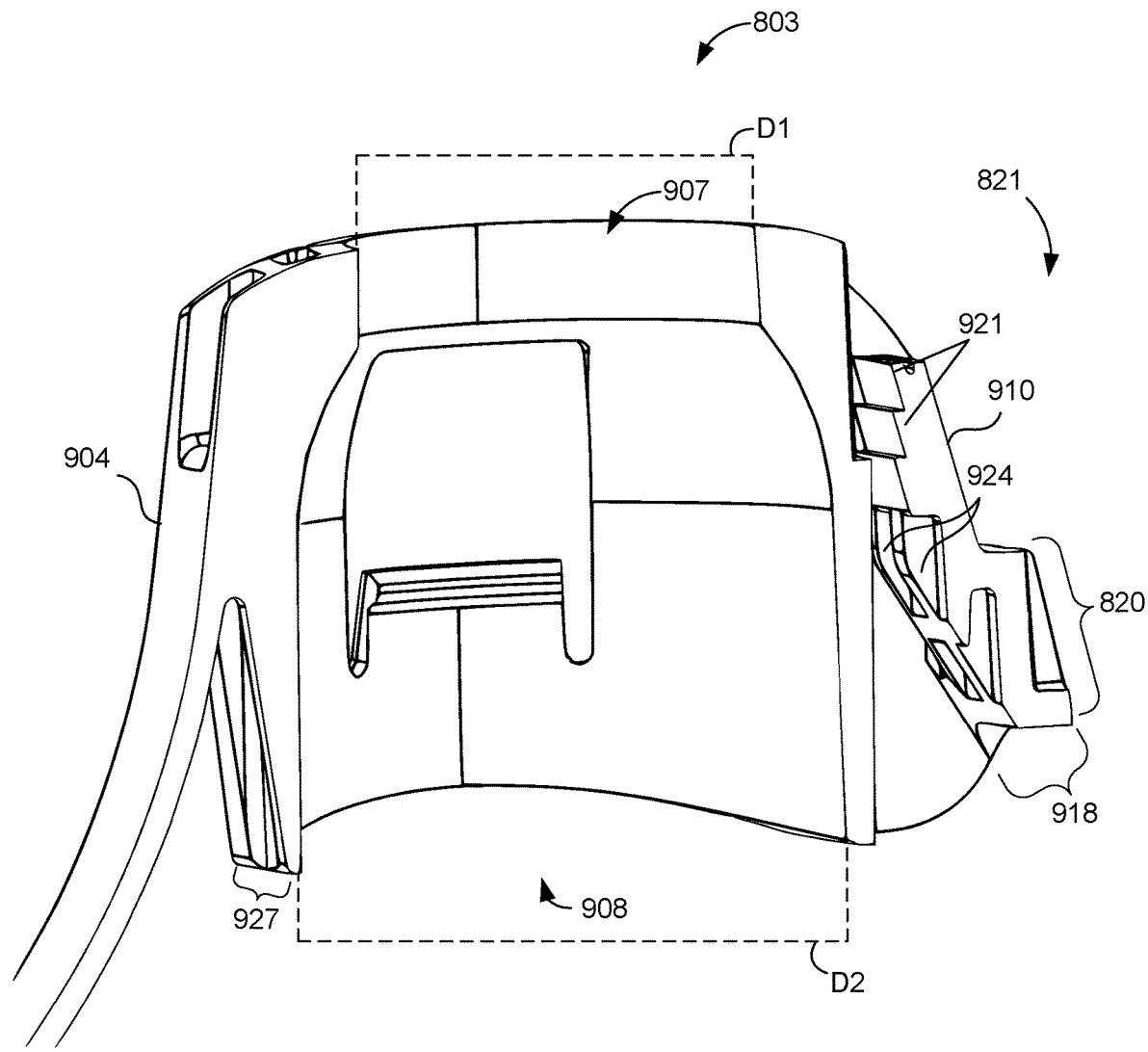

Referring to FIG. 9B, shown is a cross-sectional view of the socket 803 with the strap 812 from FIG. 9A. In the cross-sectional view, FIG. 9B illustrates that the socket 803 has a first tier and a second tier that surrounds an inner cavity. The first tier has a socket aperture 907 with a first diameter "D1," and the second tier has a base aperture 908 with a second diameter "D2." The first diameter "D1" is less than the second diameter "D2" and less than a diameter of the ball 809 (FIG. 8). The second diameter "D2" is greater than the diameter of the ball 809. The ball 809 can be positioned in the inner cavity of the socket 803. When the ball 809 is positioned in the inner cavity, a shaft of the support rod 806 extends through the first aperture of the socket 803.

FIG. 9B illustrates that the release tab 910 comprises teeth 921 for forming a locking engagement with the teeth 830 (FIG. 9A) of the strap 812. In addition, the release tab 910 comprises a bump 924 that is located below the teeth 921 of the release tab 910. The bump 924 can extend from the reinforced ribs 820 and the release tab 910. In the illustrated embodiment, the bump 924 extends down from the teeth 921 and then angles away from a center of the socket aperture 907. The bump 924 may comprise one or more ribs. With the strap 812 inserted within the strap fastener 821, the bump 924 can be used to maintain the locking engagement between the integrated strap 812 and the strap fastener 821. The bump 924 can contact the integrated strap 812 as it bends away from the center of the socket 803. This contact point at a bend transition of the strap 812 can isolate and support a horizontal force from a downward vertical force caused by the weight of the pipe. Whereas in some cases without the bump 924, a horizontal force associated with the weight of the pipe and angle of integrated strap 812 can cause the release tab 910 to move outward away from the center of the socket 803 and release the integrated strap 812. Thus, the bump 924 can facilitate maintaining the locking engagement between the strap 812 and the strap fastener 821. In some embodiments, the bump 924 may be omitted.

Figure 10:
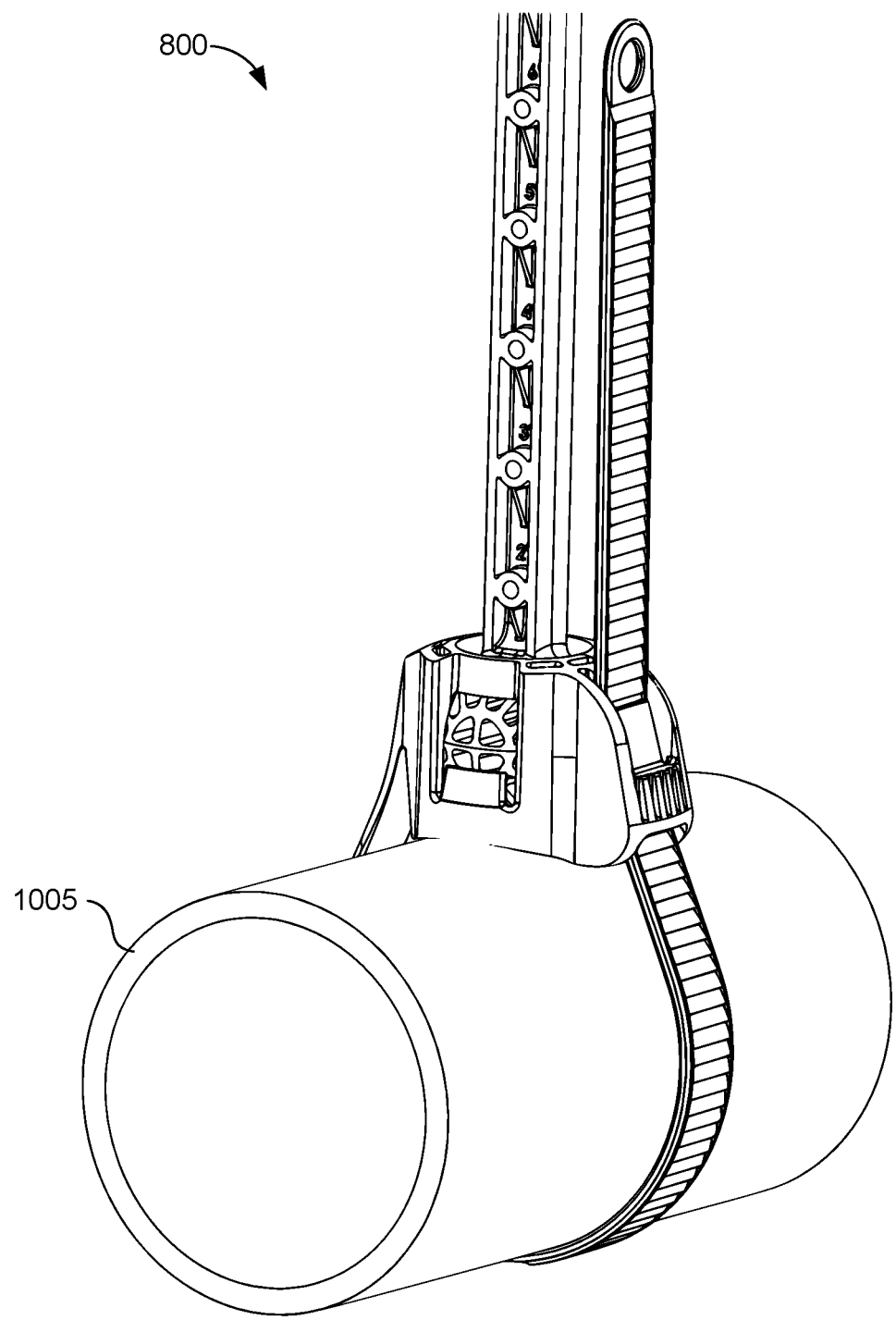
FIG. 10 illustrates a perspective view of an integrated strap hanger system securing a pipe according to one embodiment described herein.

In addition, FIG. 9B illustrates that the socket 803 has ribs 927 on an outer surface of the socket 803. The ribs 927 can strengthen socket 803 and improve the molding process by creating additional space between the strap 812 and the outer surface of the socket 803. In some embodiments, the ribs 927 may be omitted. FIG. 10 illustrates a perspective view of the integrated strap hanger system 800 (FIG. 8) being used to secure a pipe 1005.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A pipe hanger, comprising:
   a socket having a first tier and a second tier that surrounds an inner cavity, the first tier comprising a first circular aperture that has a first diameter, the second tier comprising a second circular aperture that has a second diameter, the socket having a strap fastener integral to an outer surface of the socket;
   a ball situated in the inner cavity, the ball having a third diameter that is less than the second diameter and greater than the first diameter;
   a locking tab that forms a portion of a perimeter of a side aperture in the socket, the locking tab being configured to move away and toward the inner cavity of the socket;
   a rod that extends from the ball, the rod extending from the ball through the first circular aperture; and
   a strap connected to the socket at a distal end of the strap, an end of the strap being insertable through the strap fastener at a diametrically opposite location from the distal end.

2. The pipe hanger of claim 1, wherein the locking tab comprises a first locking tab, and the socket comprises a second locking tab, the first locking tab comprising a first inner rim and the second locking tab comprising a second inner rim, the first inner rim and the second inner rim having a diameter that is less than the third diameter of the ball.

3. The pipe hanger of claim 1, wherein the strap fastener comprises a ratchet frame that has a plurality of teeth.

4. The pipe hanger of claim 1, wherein the socket comprises a docking section with at least one raised protrusion, and the distal end of the strap comprises a snap-on head.

5. The pipe hanger of claim 1, wherein the second tier of the socket comprises an arcuate edge that enables a portion of the ball to have a contact engagement with a pipe.

6. The pipe hanger of claim 1, wherein the first tier of the socket comprises an arcuate inner surface that surrounds the first circular aperture.

7. The pipe hanger of claim 6, wherein the arcuate inner surface comprises an arch that corresponds with a portion of the ball.

8. The pipe hanger of claim 6, wherein the arcuate inner surface comprises a coarse surface.

9. The pipe hanger of claim 1, wherein the strap fastener comprises a release tab, the release tab comprising a plurality of teeth for engagement with mating teeth of the strap to secure the strap.

10. The pipe hanger of claim 1, wherein the strap is integrally connected to the socket at the distal end of the strap.

11. An apparatus, comprising:
    a socket having a first tier and a second tier that surrounds an inner cavity, the first tier comprising a first circular aperture that has a first diameter, the second tier comprising a second circular aperture that has a second diameter, the socket having a strap fastener extending from an outer surface of the socket;
    a ball situated in the inner cavity, the ball having a third diameter that is less than the second diameter and greater than the first diameter;
    a locking tab that forms a portion of a perimeter of a side aperture in the socket, the locking tab being configured to move away and toward the inner cavity of the socket;
    a rod that extends from the ball, the rod extending from the ball through the first circular aperture; and
    a strap to wrap substantially around a pipe, an end of the strap being insertable through the strap fastener.

12. The apparatus of claim 11, wherein the strap fastener comprises a ratchet frame.

13. The apparatus of claim 12, wherein the strap comprises a first plurality of teeth that contact a second plurality of teeth within the ratchet frame.

14. The apparatus of claim 11, wherein the second tier of the socket comprises an arcuate edge that corresponds to a portion of a curve of the pipe.

15. The apparatus of claim 11, wherein the locking tab comprises a first locking tab, the side aperture comprising a first side aperture, and the socket comprising a second locking tab that forms a perimeter of a second side aperture in the socket.

16. A pipe hanger system, comprising:
    a socket having a first tier and a second tier that surrounds an inner cavity, the first tier comprising a first aperture that has a first diameter, the second tier comprising a second aperture that has a second diameter, the socket having a strap fastener extending from an outer surface of the socket;
    a ball situated in the inner cavity, the ball having a third diameter that is less than the second diameter and greater than the first diameter;
    a locking tab that forms a portion of a perimeter of a side aperture in the socket, the side aperture being situated at a height between the first aperture and the second aperture, the side aperture providing access to the inner cavity of the socket;
    a rod that extends from the ball, the rod extending from the ball through the first aperture; and
    a strap that comprises a plurality of teeth, wherein a portion of the plurality of teeth is used to engage with a surface of the strap fastener.

17. The pipe hanger system of claim 16, wherein the first tier of the socket comprises an arcuate inner surface that surrounds the first aperture.

18. The pipe hanger system of claim 16, wherein the locking tab comprising an inner rim has a diameter that is less than the third diameter of the ball.

19. The pipe hanger system of claim 16, wherein the strap wraps substantially around a pipe.

20. The pipe hanger system of claim 19, wherein the pipe has a contact engagement with a portion of the ball.

21. A pipe hanger, comprising:
    a socket having a first tier and a second tier that surrounds an inner cavity, the first tier comprising a first aperture that has a first diameter, the second tier comprising a second aperture that has a second diameter;
    a strap fastener extending from an outer surface of the socket, the strap fastener comprising a bump that has a first portion and a second portion, the first portion of the bump extending downward from a release tab of the strap fastener and the second portion being angled away from the inner cavity of the socket;
    a ball situated in the inner cavity, the ball having a third diameter that is less than the second diameter and greater than the first diameter;
    a rod that extends from the ball, the rod extending from the ball through the first aperture; and
    a strap to wrap substantially around a pipe, a first end of the strap extending from the outer surface of the socket, a second end of the strap being insertable through the strap fastener, the strap contacting the bump at a bend transition of the strap.

* * * * *